United States Patent
Yan

(10) Patent No.: US 11,790,055 B2
(45) Date of Patent: Oct. 17, 2023

(54) DOCKER CONTAINER BASED APPLICATION LICENSING METHOD, ELECTRONIC DEVICE AND MEDIUM

(71) Applicant: BOE TECHNOLOGY GROUP CO., LTD., Beijing (CN)

(72) Inventor: Xinquan Yan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 123 days.

(21) Appl. No.: 17/514,501

(22) Filed: Oct. 29, 2021

(65) Prior Publication Data
US 2022/0318344 A1    Oct. 6, 2022

(30) Foreign Application Priority Data

Mar. 31, 2021 (CN) .......................... 202110349882.2

(51) Int. Cl.
*G06F 21/10* (2013.01)

(52) U.S. Cl.
CPC .... *G06F 21/105* (2013.01); *G06F 2221/2101* (2013.01)

(58) Field of Classification Search
CPC .................... G06F 21/105; G06F 2221/201
USPC ............................................. 726/26
See application file for complete search history.

(56) References Cited

U.S. PATENT DOCUMENTS

| | | | |
|---|---|---|---|
| 8,266,676 B2* | 9/2012 | Hardjono | H04L 63/1433 713/181 |
| 2014/0282900 A1* | 9/2014 | Wang | H04L 63/04 726/4 |
| 2018/0196654 A1* | 7/2018 | Bo | G06F 8/60 |
| 2018/0268115 A1* | 9/2018 | Zhang | G06F 8/63 |

* cited by examiner

*Primary Examiner* — Michael S McNally
(74) *Attorney, Agent, or Firm* — Myers Bigel, P.A.

(57) ABSTRACT

This application discloses a Docker container based application licensing method, apparatus, device and medium, wherein the method includes identifying a Docker container which is in a startup state, obtaining an image file of the Docker container and obtaining a license file of the Docker container from the image file, and determining whether the Docker container is authorized to be licensed according to the license file. Thus, a problem is solved that a controllable protection cannot be done for a software provider due to replication and abuse of authorization.

18 Claims, 8 Drawing Sheets

```
[root@cdhm eric]# docker build.t boe_test:v1.
Sending build context to Docker daemon 23.91 MB
Step 1:FROM 10.252.96.249/cloud/searchengine
--->879d23b8eb80
Step 2: COPY a5e4c87aa1b1ad044d4566421e02f784.lic/opt/boe/clf/
.hidden/a5e4c87aa1b1ad044d4566421e02f784.lic
--->5d51e6d695ad
Removing intermediate container bc5233989bcb
Step 3:ENTRYPOINT java.server.Xmslg.Xmxlg.Djava.security.egd=file:/
dev/./urandom.jar/usr/src/myapp/cloud-search-engine-1.0.0.jar
--->Running in 1d0999e6d249
--->d7170e906fc4
Removing intermediate container 1d0999e6d249
Successfully built d7170e906fc4
```

Fig. 3

```
FROM 10.252.96.249/cloud/searchengine
COPY a5e4c87aa1blad044d4566421e02f784.lic/opt/boe/clf/.hidden/
a5e4c87aa1b1ad044d4566421e02f784.lic
LABEL_grant.number="1" license.expire="2021-12-31"
ENTRYPOINT["java","-server","-Xmslg","-Xmxlg","-Djava.security.egd=file:/
dev/./urandom","-jar"/usr]
```

Fig. 4

DOCKER CONTAINER BASED APPLICATION LICENSING METHOD, ELECTRONIC DEVICE AND MEDIUM

RELATED APPLICATIONS

The present application claims the benefit of Chinese Patent Application No. 202110349882.2, filed on Mar. 31, 2021, the entire disclosure of which is incorporated herein by reference.

TECHNICAL FIELD

The disclosure generally relates to the field of computer technology, and in particular, to a Docker container based application licensing method, device and medium.

BACKGROUND

A Docker container may run an application (e.g., a website, a game, etc.) based on the virtualization technology. Due to the virtual characteristics of the container, its life cycle is not controllable, and exit, rebuild, etc. often occurs.

However, since instances of several containers, or even more than one hundred containers may be run on one machine, and once an authorization is obtained, a Docker user may run multiple containers, this results in that the Docker user may abuse Docker containers within an unauthorized and unlicensed scope, and a controllable protection cannot be done for software providers. Such a problem is to be solved.

SUMMARY

In view of the above defects or deficiencies in the related art, it is intended to provide a Docker container based application licensing method, apparatus, device and medium, to at least partially solve the problem that a controllable protection cannot be done for a software provider due to replication and abuse of authorization.

In a first aspect, an embodiment of this application provides a Docker container based application licensing method including:
identifying a Docker container which is in a startup state;
obtaining an image file of the Docker container and obtaining a license file of the Docker container from the image file; and
determining whether the Docker container is authorized to be licensed according to the license file.

In an embodiment, the Docker container is started by a business node based on the image file, and the image file is pulled and obtained by the business node from a Private Cloud.

In an embodiment, a secure path of the license file is burned into the image file, and the obtaining an image file of the Docker container and obtaining a license file of the Docker container from the image file further includes:
obtaining the image file to get the secure path therefrom; and
reading the license file according to the secure path.

In an embodiment, the license file is encrypted, and the determining whether the Docker container is authorized to be licensed according to the license file includes:
decrypting the license file to get at least one license tag for the Docker container, which indicates an authorization rule; and
determining whether the Docker container is authorized to be licensed based on the at least one license tag.

In an embodiment, the authorization rule includes a number of containers which are allowed to be run at the same time, and the determining whether the Docker container is authorized to be licensed based on the at least one license tag includes:
detecting an actual number of Docker containers running currently on a host; and
determining that the Docker container is authorized to be licensed when the actual number is less than or equal to the number of containers which are allowed to be run at the same time.

In an embodiment, the authorization rule includes an authorization period of the Docker container, and the determining whether the Docker container is authorized to be licensed based on the at least one license tag includes:
determining expiration time of the Docker container according to the authorization period;
obtaining current time the host is running; and
determining that the Docker container is authorized to be licensed when the current time has not reached the expiration time.

In an embodiment, the method further includes:
determining at least one Docker container which is not authorized to be licensed when the actual number is larger than the number of containers which are allowed to be run at the same time; and
forcibly terminating the at least one Docker container which is not authorized to be licensed.

In an embodiment, the determining at least one Docker container which is not authorized to be licensed includes:
obtaining a forcible termination rule from the image file; and
determining the at least one Docker container which is not authorized to be licensed from multiple Docker containers that are running according to the forcible termination rule.

In an embodiment, the method further includes:
sending alarm information to a corresponding application and/or recording the alarm information in an application log in response to determination that the Docker container is not licensed.

In an embodiment, the method further includes:
recording an authorization log.

In a second aspect, an embodiment of this application provides a Docker container based application licensing apparatus including:
a identification module for identifying a Docker container which is in a startup state;
a first obtaining module for obtaining an image file of the Docker container and obtaining a license file of the Docker container from the image file; and
a determination module for determining whether the Docker container is authorized to be licensed according to the license file.

In a third aspect, an embodiment of this application provides an electronic device including a memory, a processor and a computer program which is stored on the memory and may be run on the processor, and when executing the program, the processor implements the Docker container based application licensing method as described in the embodiments of this application.

In a fourth aspect, an embodiment of this application provides a computer readable storage medium storing a computer program thereon, and when executed by a processor, the program implements the Docker container based application licensing method as described in the embodiments of this application.

Additional aspects and advantages of this disclosure will be partially given in the following description, and part thereof will become evident from the following description or learned from the practice of this disclosure.

BRIEF DESCRIPTION OF THE DRAWINGS

Other features, objects and advantages of this application will become more evident by reading a detailed description of non-limiting embodiments made with reference to the following drawings.

FIG. 3 shows a flow adapted for implementing startup of building an image file of example embodiments of this application.

FIG. 4 shows a schematic diagram adapted for implementing a license tag of example embodiments of this application.

DETAILED DESCRIPTION

Figure 1:
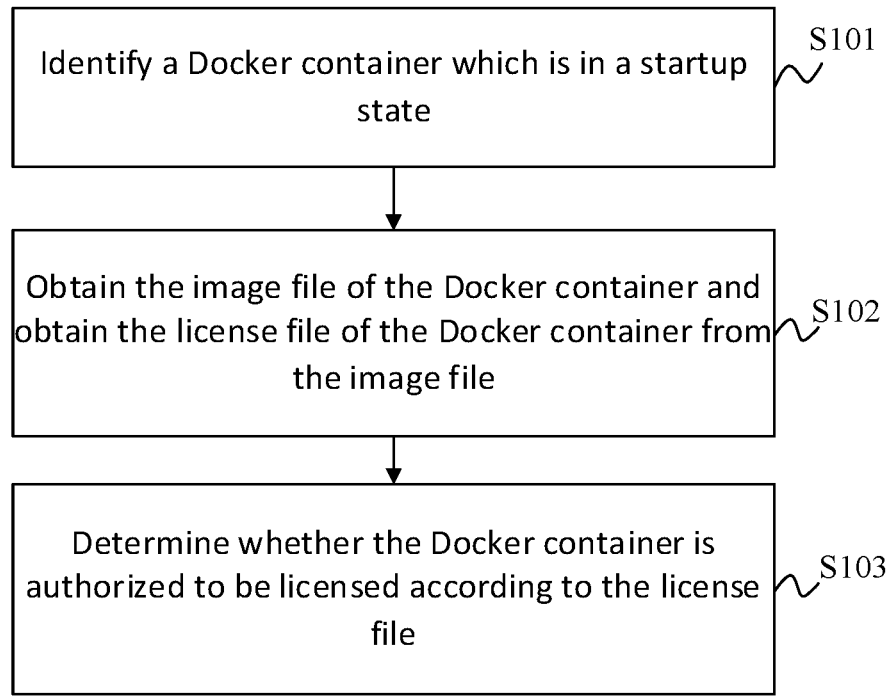
FIG. 1 shows a flow chart adapted for implementing a Docker container based application licensing method of an embodiment of this application.

In the following the application will be further described in detail in conjunction with the drawings and embodiments. It may be appreciated that the specific embodiments described herein are merely used for explaining the related disclosure, but not limiting the disclosure. In addition, it is further noted that only those parts related with the disclosure are shown in the drawings for the convenience of description.

It is noted that, in the absence of conflict, the embodiments in this application and the features in the embodiments may be combined with each other. In the following, the application will be described in detail with reference to the drawings and in conjunction with the embodiments.

FIG. 1 shows a flow chart adapted for implementing a Docker container based application licensing method of an embodiment of this application.

Before the Docker container based application authorization licensing method of the embodiment of this application is introduced, a Docker container SaaS (Software-as-a-Service) applicable to this application will be introduced first.

In particular, the Docker container is an open-source application container engine, which enables developers to pack their applications and environment data on which the applications depend into a portable container and then publish them on any server with the docker engine installed, for example, a Linux or Windows machine.

Docker belongs to a package of a Linux container and may provide a simple and easy-to-use container usage interface. Since a software developer has already packed an application and environment data on which the program depends into a file (i.e., a Docker image), a software buyer may be able to generate a corresponding virtual container, namely, a Docker container, on a host directly by running this file, and the program packaged in the Docker image may run in the virtual container. A unique identification of the Docker image is guaranteed by a digest of the image, and the digest of the Docker image cannot be tampered, thereby guaranteeing the stability of the developer's authorization to the software buyer.

That is, an interface of the Docker is quite simple, and the software developer may conveniently create and use a container, and place its own application into the container; and the Docker container may further perform operations of version management, replication, sharing, modification, and so on.

SaaS refers to a new mode in which software service is provided through the Internet. In a conventional mode, a manufacturer accomplishes delivery by deploying a software product on multiple client terminals inside an enterprise via a license protocol, whereas in the SaaS mode, the manufacturer uniformly deploys application software on its own server, and a customer may order required application software services from the manufacturer through the internet according to its own actual needs, pay the manufacturer according to the quantity and time length of the services ordered, and obtain the services provided by the manufacturer through the internet. SaaS defines a new way of delivery, and also causes software to further return to the essence of service.

SaaS application software has three modes of free of charge, payment and value-added. Payment is usually an "all inclusive" fee including the usual application software license fee, software maintenance fee and technical support fee. As shown in FIG. 1, the Docker container based application licensing method of the embodiment of this application includes the following steps.

At step 101, a Docker container which is in a startup state is identified.

Therein, the Docker container is a carrier of one or a set of applications running independently, it is a concept similar to an object, a Docker image is a hard disk file of a system, many containers can be generated by the Docker image, a relevant program is set in each Docker image, the Docker image is made up of layers, and a corresponding Docker container is determined according to a program set on the uppermost layer of the Docker image, that is, the Docker container is an entity of the Docker image at the runtime. In other words, the Docker container is obtained by the running of a host according to content of the Docker image.

Further, a Docker image file is a template for creating a Docker container, it packs an application implementing a business function and environment data on which the application depends into a "software package", which is similar to a software installation package, and a user downloads the Docker image file to the host via a storage device such as a cloud storage device, and then starts it through a special command.

In an example, the cloud storage device may include a Public Cloud and a Private Cloud. Therein, the Public Cloud generally refers to a cloud that is provided by a third party provider for the user and can be used, the Public Cloud may generally be used through the Internet and may be free of charge or low-cost, and a core property of the Public Cloud is shared resource services. A Private Cloud is to create a cloud infrastructure and hardware & software resources inside a firewall, for various departments within an enterprise or institution to share a resource in a data center. For creating a Private Cloud, in addition to hardware resources, there is generally also cloud device software (Iaas, i.e., Infrastructure as a Service). Private Cloud computing also includes three levels of cloud hardware, cloud platform and cloud service. The difference is that the cloud hardware is a user's own personal computer or server, but not a data center of a cloud computing manufacturer. A goal of the cloud computing manufacturer building the data center is to provide tens of millions of users with Public Cloud services, and therefore it needs to have tens of up to a million of servers. For an enterprise, the Private Cloud computing only serves employees of the enterprise and customers and suppliers of the enterprise. Therefore, the software buyer of this application may download the Docker image file from the Private Cloud, which effectively improves the security during download of the Docker image file, and reduces the risk of being cracked by a software developer or a hacker because of use of the Public Cloud.

Therein, the Private Cloud may be deployed inside the firewall of the data center of the enterprise, or also be deployed in a secure physical machine hosting place, and a core property of the Private Cloud is proprietary resources.

In an example, to further increase the security of the Docker image file, the software buyer may set an image repository in the Private Cloud, the image repository may be accessed via an independent password, and the Docker image may be stored in the image repository, which may thus further reduce the possibility of a non-software buyer obtaining the Docker image, thereby reduce the risk of the Docker image being cracked maliciously, and improving controllable protection for the software developer.

In one or more embodiment, the Private Cloud may be provided by the software developer, that is, the software developer stores the Docker image file that has been packaged in the Private Cloud of the software developer, and the software buyer pulls the Docker image file from the Private Cloud of the software developer or the image repository in the Private Cloud using information such as a Private Cloud address, an identification of a bought product, etc. provided by the software developer.

Further, an embodiment of this application may implement pull via a "Docker pull command", and docker pull refers to pulling or updating a specified image from the Private Cloud. For example, a pulled image file is a product image of a java file stored in the Private Cloud by the software buyer, namely, docker pull java.

That is, the embodiment of this application may first download an image file (e.g., a software package) corresponding to a Docker container to be started to the locality, which image file contains a license file, pull the image file containing the license file to the locality, and then start the Docker container using the image file. Therefore, the embodiment of this application may perform identification according to a reading condition of the image file when identifying the Docker container in the startup state. In the embodiment of this application, a license file is set, and a rule by which a docker container is authorized to be licensed is set in the license file, as the basis for a docker container being authorized to be licensed. The rule for example includes: a period of validity of software authorization, a number limit of software authorization, etc.

At step 102, the image file of the Docker container is obtained and the license file of the Docker container is obtained from the image file.

Therein, a secure path storing the license file of the Docker container is burned into the image file, and after the image file of the Docker container is obtained by pulling, the license file of the Docker container may be obtained from the image file, which includes: reading a digest of the image file, obtaining the image file and determining the authenticity of the image file through the digest, thereby getting the secure path; and reading the license file according to the secure path. Therein, the digest may be implemented using a digest of SHA256, as shown in Table 1. SHA is the abbreviation of Secure Hash Algorithm. Burn refers to burning required data into a storage medium, for example, an optical disc, a burning card, a computer readable storage medium, etc., through a corresponding burning tool. In this application, the storage medium may be a computer readable storage medium for storing an image file.

By burning a secure path storing the license file of the Docker container in the image file, the embodiment of this application implements audit of whether the docker container is authorized to be licensed, resulting in that a Docker user cannot abuse a Docker container within an unauthorized and unlicensed scope and implementing a controllable protection for software providers.

Figure 2:
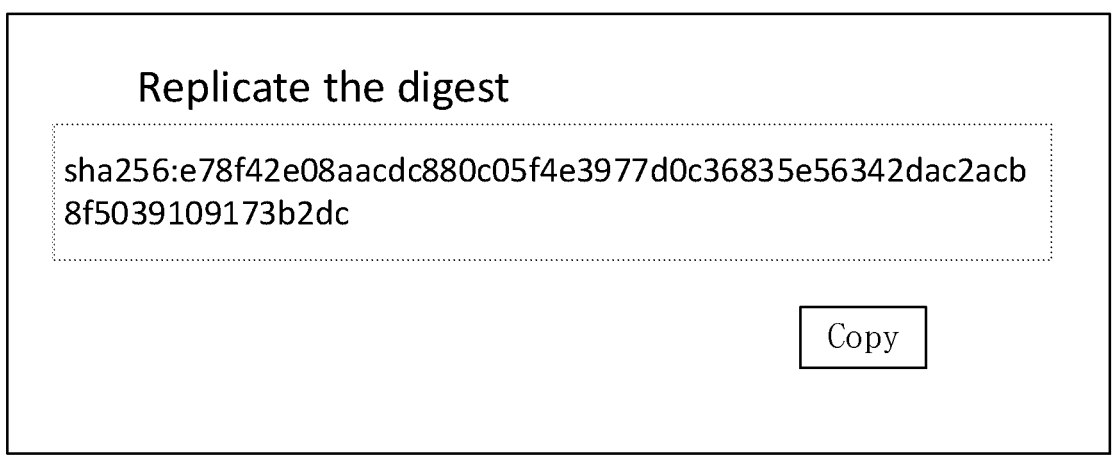
FIG. 2 shows a schematic diagram adapted for implementing formation of an image digest of example embodiments of this application.

It should be understood that a customized image containing a license file is pushed into an image repository (which is for example located in a Private Cloud) and a digest of the image is formed, as shown in FIG. 2 and Table 1 (the text in Table 1 is just one in the box in FIG. 2), to uniquely identify an image file and ensure that the image file cannot be tampered. Before this, a license file in a Dockerfile is mapped to a secure path in an image system, wherein the Dockerfile is a text file for building an image, and the text content contains instructions and description required for building the image; that is, the dockerfile is a source code file for making the image and instructions during building of a container, and the docker can read instructions of the dockerfile to build the container automatically and build the image based on the dockerfile.

A digest of an image file generally implements verification of the authenticity of the image file via an image signature. The image signature is a signature file encrypted by a private key of a signer and containing the digest of the image file. A decrypted digest is gotten by using a public key of the signer to decrypt the signature file, and it is judged whether it is consistent with a digest that is saved, thereby determining the authenticity of the image file, that is, it is not tampered.

A name of a license file may be composed of numbers and letters. For example, an embodiment of this application may name the license file as:

a5e4c87aa1b1ad044d4566421e02f784.lic.

In an example, the license file is encrypted.

An embodiment of this application may map the image file to a secure path in the system, wherein the secure path may be a hidden folder, for example, the hidden folder may be/opt/boe/clf/.hidden, thereby achieving effective protection of the license file and effectively avoiding that the license file is replicated maliciously.

TABLE 1 sha256:e78f42e08aacdc880c05f4e3977d0c36835e56342dac2acb8f5039109173b2dc

Further, as shown in FIG. 3, FIG. 3 is a schematic diagram in which an embodiment of this application starts a flow of building an image file and builds a license file into the image file, whereby after obtaining the image file of the Docker container, the embodiment of this application may obtain the license file of the Docker container from the image file. A text copy of FIG. 3 is as follows:

[root@cdhm eric]#docker build.t boe_test:v1.
Sending build context to Docker daemon 23.91 MB
Step 1: FROM 10.252.96.249/cloud/searchengine
- - - >879d23b8eb80
Step 2: COPY a5e4c87aa1b1ad044d4566421e02f784.1ic/opt/boe/clf/.hidden/
a5e4c87aa1b1ad044d4566421e02f784.lic
- - - >5d51e6d695ad
Removing intermediate container bc5233989bcb
Step 3:ENTRYPOINT java.server.Xmslg.Xmxlg.Djava.security.egd=fileidev/./urandom.jar/usr/src/myapp/cloud-search-engine-1.0.0.jar
- - - >Running in 1d0999e6d249
- - - >d7170e906fc4
Removing intermediate container 1d0999e6d249
Successfully built d7170e906fc4

Therein, there are multiple formats of the license file, as shown in Table 2 to Table 4. Table 2 is a simple string format, the string may be composed of five parts, each part contains five digits, and the five digits may be generated randomly by numbers and letters; Table 3 is a multi-factor character set format, the string may be composed of five parts, a first part is a random number, and the remaining four parts are composed of five random numbers; and Table 4 is a self-contained comprehensive certificate format, which may be generated randomly by numbers and uppercase and lowercase letters. The person having ordinary skill in the art may select a corresponding format of the license file according to the actual situation, which will not be elaborated here to avoid redundancy.

TABLE 2

A product: W269N-WFGWX-YVC9B-4J6C9-T83GX
B product: NPPR9-FWDCX-D2C8J-H872K-2YT43

TABLE 3 key:0-63920-03473-29060-04749
Sitemessage:BOE

TABLE 4 eyJsaWNlbnNlSWQiOiJDTkVLSlBRWkVYIiwibGljZW5zZWV1IljoibGFuIHl1IiwiYXNzaWduZWVOYW1lIjoiIiwiYXNzaWdu
xpY2Vuc2VSZXN0cmljdG1vbiI6IkZvciBlZHVjYXRpb25hbCB1
c2Ugb25seSIsImNoZWNrQ29uY3VycmVudFVzZSI6ZmFsc2Us
eyJjb2RlIjoiQUMiLCJwYWlkVXBUbyI6IjIwMTgtMDEtMzAifS
iJETSIsInBhaWRVcFRvIjoiMjAxOC0wMS0zMCJ9LHsiY29kZS At step 103, it is determined whether the Docker container is authorized to be licensed according to the license file.

In an embodiment, the license file is encrypted, and determining whether the Docker container is authorized to be licensed according to the license file includes: decrypting the license file to get at least one license tag for the Docker container; and determining whether the Docker container is authorized to be licensed based on the at least one license tag.

In particular, an embodiment of this application may obtain the encrypted license file from a secure hidden path of the image file of the Docker container, for example:
a5e4c87aa1b1ad044d4566421e02f784.lic;
thus, the license file may be decrypted to obtain the at least one license tag for the Docker container, wherein a schematic diagram of a license tag may be as shown in FIG. 4. It can be seen from FIG. 4 that the number of authorized containers is 1, the period of validity is Dec. 31, 2020; thereby it may be possible to judge whether the Docker container is authorized to be licensed according to the license tag, implementing the controllability of authorization licensing.

As a possible implementation, the license tag includes a preset number of containers that are running at the same time, and the determining whether the Docker container is authorized to be licensed based on the at least one license tag includes: detecting an actual number of Docker containers currently running on a host; and determining that the Docker container is authorized to be licensed when the actual number is less than or equal to a preset number of containers. Therein, the host may be a localhost, or also may be a remote host.

In particular, an embodiment of this application may determine the Docker container to be authorized to be licensed according to a number of instances that are legally authorized, for example, utilize an original image digest and a currently obtained image digest for comparison, allow the container to run if they are the same, and perform statistics and counting, thereby obtaining the number of instances running on the machine, and verify whether it is in a legal scope, to determine whether the Docker container is authorized to be licensed.

As another possible implementation, the license tag includes an authorization period of the Docker container, and the determining whether the Docker container is authorized to be licensed based on the at least one license tag includes: determining expiration time of the Docker container according to the authorization period; obtaining current time the host is running; and determining that the Docker container is authorized to be licensed when the current time has not reached the expiration time.

It should be understood that the authorization period may be three months, six months, one year, etc. An embodiment of this application may start authorized containers 1 . . . N with reference to tag information of a Docker container according to a license requirement. As shown in Table 5, tag authorization information of the Docker container is that: the number of authorized containers is 1, and the period of validity is Dec. 31, 2020.

TABLE 5 grant.number="1"license.expire="2021-12-31"

That is, the expiration time of the Docker container is Dec. 31, 2020, it is determined that the Docker container is authorized to be licensed if the current time when the current host is running has not reached Dec. 31, 2020, and it is indicated that the authorization period expires and it is impossible to continue running the software if the current time when the current host is running has reached Dec. 31, 2020.

It can be seen from this that an embodiment of this application is further arranged with a license auditing module, and performs operations of license check, verification, and management & control on a container of a business application currently running on the host via the license auditing module, to mainly ensure that the container running on the host is running under the premise of justifiability & compliance, for example, check whether the license file contained in the container is officially issued or not, whether it has been tampered or not, whether the authorized software in the license file is a legal copy or not, whether the authorization of the software expires or not, whether the authorized number is within a specified number, or the like. If it is not compliant, an abnormal container will be forcibly terminated. The license auditing module may be a separate container or process, may be started continuously and circularly, and thereby may perform operations of license check, verification, and management & control on a container of a business application running on the host in real time. In one example, it may be started separately by a host manager (see the description with reference to FIG. 5 in the following), and in another example, it may be started with the generation of the container of the business application; moreover, to prevent the image from being tampered, for example, changing its name and the license & authorization file, it utilizes an original image digest and image summaries of all currently running containers for comparison, allows the container to run only if they are the same, and performs statistics and counting. This is usually implemented via an image signature.

In addition, if verification of the authorization rule fails, alarm information is sent to a related application, warning a business user that the current authorization exceeds the limit and exceeds the boundary, and the alarm information is recorded in a business log for the ease of business viewing and in order for backtracking. An audit result is as shown in Table 6.

TABLE 6

| Audit time | Audit object | Audit result | Audit reason | Audit process |
| --- | --- | --- | --- | --- |
| 2020 Dec. 31 | BOEXX system | Success | Authorization compliant | LicenseSidecar |
| 2020 Dec. 30 | BOEXX system | Fail | Authorization expire | LicenseSidecar |

In an embodiment, the method further includes: obtaining at least one Docker container which is not authorized to be licensed; obtaining a forcible termination rule from the image file; and forcibly terminating the at least one Docker container which is not authorized to be licensed according to the forcible termination rule.

Therein, the forcible termination rule may forcibly terminate the newest started container sorted by time according to a business scenario; or also may forcibly terminate the oldest started container; or also may randomly select a container for forcible termination, which will not be specifically defined here.

In particular, an embodiment of this application may further obtain one or more Docker container which is not authorized to be licensed, and may employ the same forcible termination rule or also employ a different forcible termination rule for a different Docker container which is not authorized to be licensed, and specifically, forcible termination may be conducted by a relevant technician according to the actual situation, which will not be elaborated here to avoid redundancy.

Thus, forcibly terminating a Docker container which is not authorized to be licensed by the obtained forcible termination rule effectively guarantees the controllability of the Docker container in licensed and compliant operation, and solves the problem that a controllable protection cannot be done for a software provider due to replication and abuse of authorization.

In the following, a further description will be made in conjunction with FIG. 5 and FIG. 6 to cause the person having ordinary skill in the art to further learn about the Docker container based application authorization licensing method of an embodiment of this application.

Figure 5:
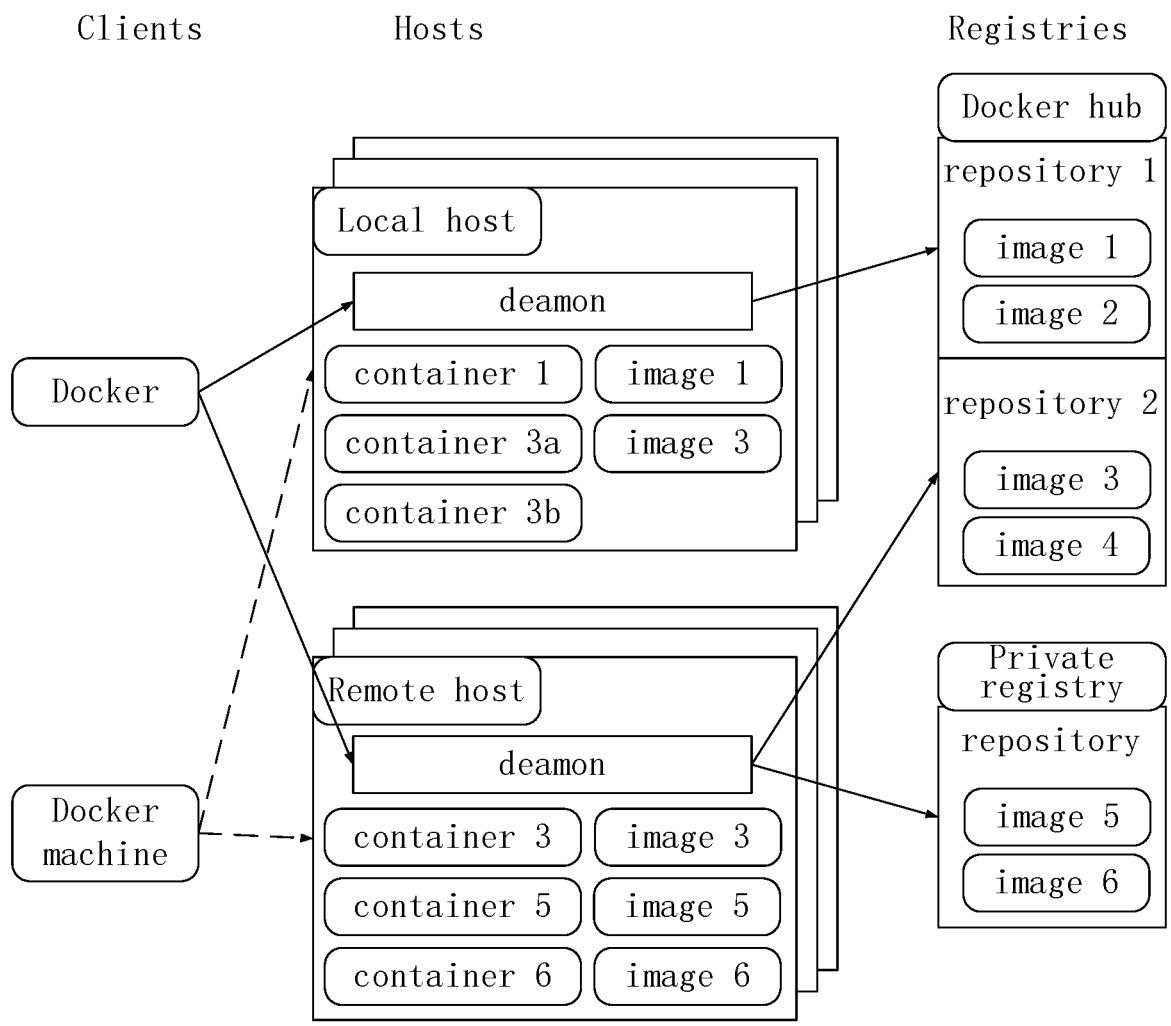
FIG. 5 shows a schematic diagram adapted for implementing a Docker container based application licensing system of example embodiments of this application.

As shown in FIG. 5, FIG. 5 is a schematic diagram of a system involved in a Docker container based application licensing method of example embodiments of this application. The system includes clients, hosts and registries.

In particular, a Docker client uses Docker SDK to communicate with a Docker's daemon via a command line or other tools. The Docker's daemon is a monitoring console in the background run by the Docker container, it contains information on containers such as a list of containers that are running (e.g., container 1, container 3a, container 3b, etc.), states of containers that are running, the number of containers that are running, and so on, the condition of containers currently running on the machine may be learned about in real time via it, and a specified container may be restarted or forcibly terminated via it; a host is a physical or virtual machine for executing a Docker daemon and a container, and it may include a local host and a remote host. A container is a state in which an image is running, for example, an interface on which a game is operating, and it provides an application service. A daemon is a background process of a system, and it is similar to a supervision program of the system and is used for monitoring and controlling the running of a container.

Docker registries may be divided into an official registry (Docker hub) and a private registry. A registry may be a code repository in code control and a Docker registry may contain one or more repository, for example, repository 1, repository 2 in FIG. 5; and each repository may contain multiple tags, and each of the tags corresponds to an image, for example, image 1, image 3, image 5, etc. in FIG. 5. A tag is a mark set for an image file (a virtual software package). For example, an image of an application is artificial intelligent image processing software, and then a mark may be set for it, which will facilitate a user querying and downloading an image of interest. An example of the tag is: Category=AI, Product=Image processing, Expiration time=2021 Dec. 31.

A Docker machine is a command line tool simplifying Docker installation. In particular, the Docker machine is a tool which may install a Docker on a virtual host, and may use a docker-machine command to manage a host; the Docker machine may also centrally to manage all docker hosts, for example, quickly install a docker on servers 100.

It may install a Docker on a corresponding local or remote platform. It is similar to a standard tool for installing and running a container, and helps a user to conveniently install a Docker on various machines.

As shown in FIG. 5, a client may communicate with one or more host, and a daemon of a host may communicate with one or more registry.

Figure 6:
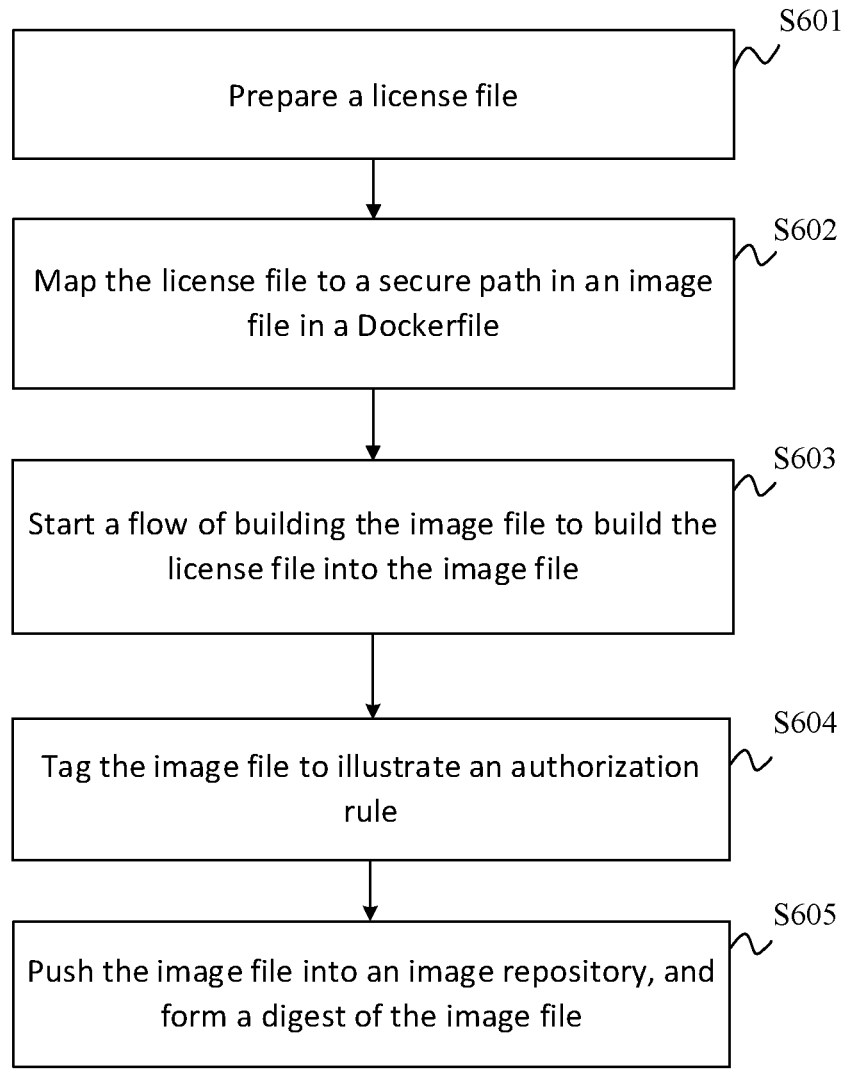
FIG. 6 shows a flow chart adapted for implementing generation of an image file of example embodiments of this application.

Further, as shown in FIG. 6, FIG. 6 is a flow chart of generating an image file of example embodiments of this application.

S601, a license file is prepared. There may be a variety of formats for the license file, as described above with respect to Table 2 to Table 4.

S602, the license file is mapped to a secure path in an image file in a Dockerfile. For example, the license file is named as a5e4c87aa1b1ad044d4566421e02f784.lic, and mapped to a folder /opt/boe/clf/.hidden, for example.

S603, a flow of building the image file is started to build the license file into the image file.

S604, the image file is tagged to illustrate an authorization rule.

S605, the image file obtained at the above steps is pushed into an image repository (the image repository is located on a Private Cloud, for example), and a digest of the image file is formed, as shown in FIG. 2 and Table 1, to uniquely identify the image file and ensure that the image file cannot be tampered. The digest of the image file usually implements verification of the authenticity of the image file via an image signature.

Figure 7A:
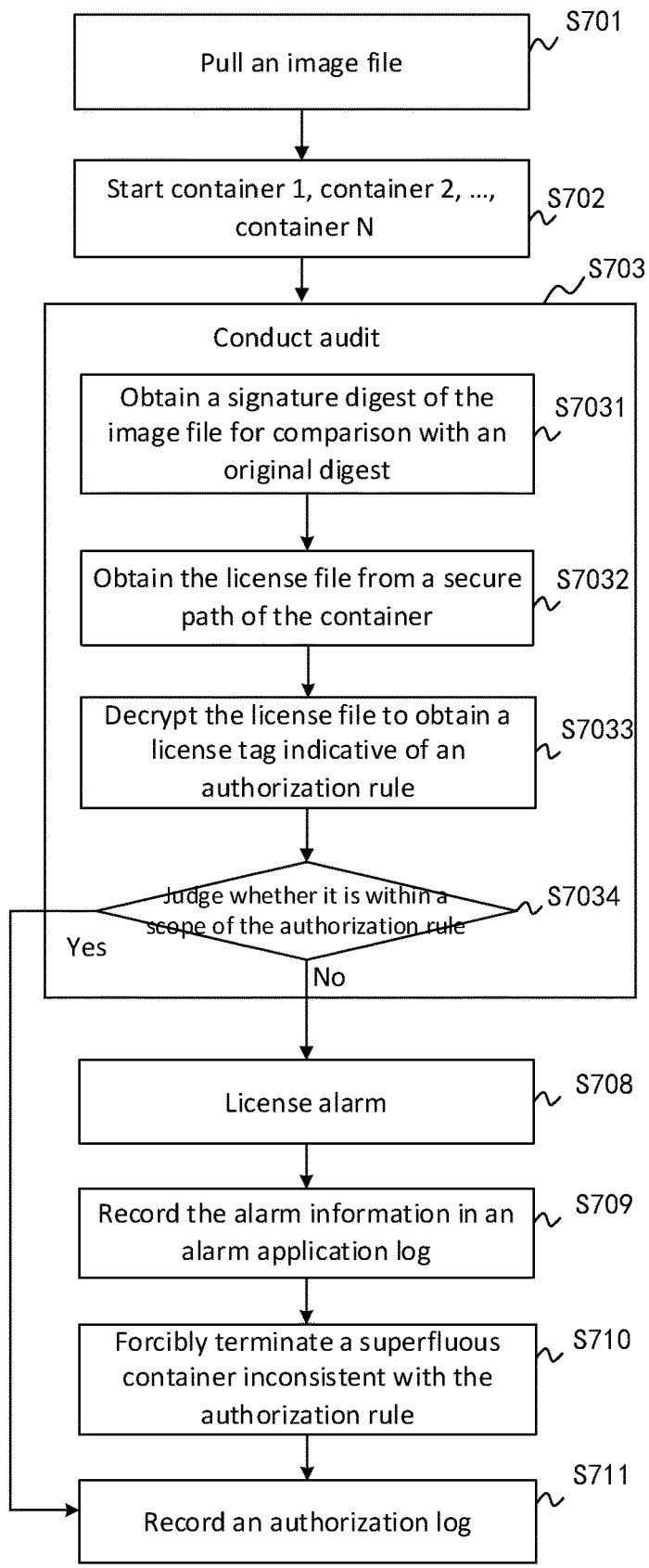
FIG. 7a shows a flow chart adapted for implementing license audit of example embodiments of this application.

Further, as shown in FIG. 7a, FIG. 7a is a flow chart of license audit according to example embodiments of this application.

S701, an image file is pulled. A business node pulls a customized image file containing a license file from for example a Private Cloud to the locality as a preparation for starting a container instance.

S702, container 1, container 2, . . . , container N are started.

S703, audit is conducted. Audit performs operations of license check, verification, and management & control on a container of a business application currently running on a host, to mainly ensure that the container running on the host is running under the premise of justifiability & compliance, for example, check whether the license file contained in the container is officially issued or not, whether it has been tampered or not, whether authorized software in the license file is a legal copy or not, whether the authorization of the software expires or not, whether the authorized number is within a specified number, or the like. If it is not compliant, an abnormal container will be forcibly terminated. In particular, there is included the following steps S7031-S7034.

S7031, a digest of the image file is obtained for comparison with an original digest, and if the comparison is successful, the container is allowed to run, and statistics and counting is performed. In general, the comparison of summaries is implemented via an image signature, which has been illustrated in the above and will not be repeated here any longer.

S7032, the license file is obtained from a secure path of the container, for example, a5e4c87aa1b1ad044d4566421e02f784.lic. The license file has been encrypted.

S7033, the license file is decrypted to obtain a license tag indicative of an authorization rule.

S7034, it is judged whether it is within a scope of the authorization rule (for example, whether the authorization expires, whether the authorized number is within a specified number, or the like), and if yes, step S711 is performed, otherwise, step S708 is performed.

S708, license alarm sends alarm information to a corresponding application to warn the user.

S709, the alarm information is recorded in an application log for the convenience of viewing.

S710, the container inconsistent with the authorization rule is forcibly terminated. A rule of termination may forcibly terminate the most newly started container sorted by time according to an application scenario, or also may terminate the earliest started container, or may randomly terminate a container.

S711, an authorization log is recorded for the convenience of backtracking.

Figure 7B:
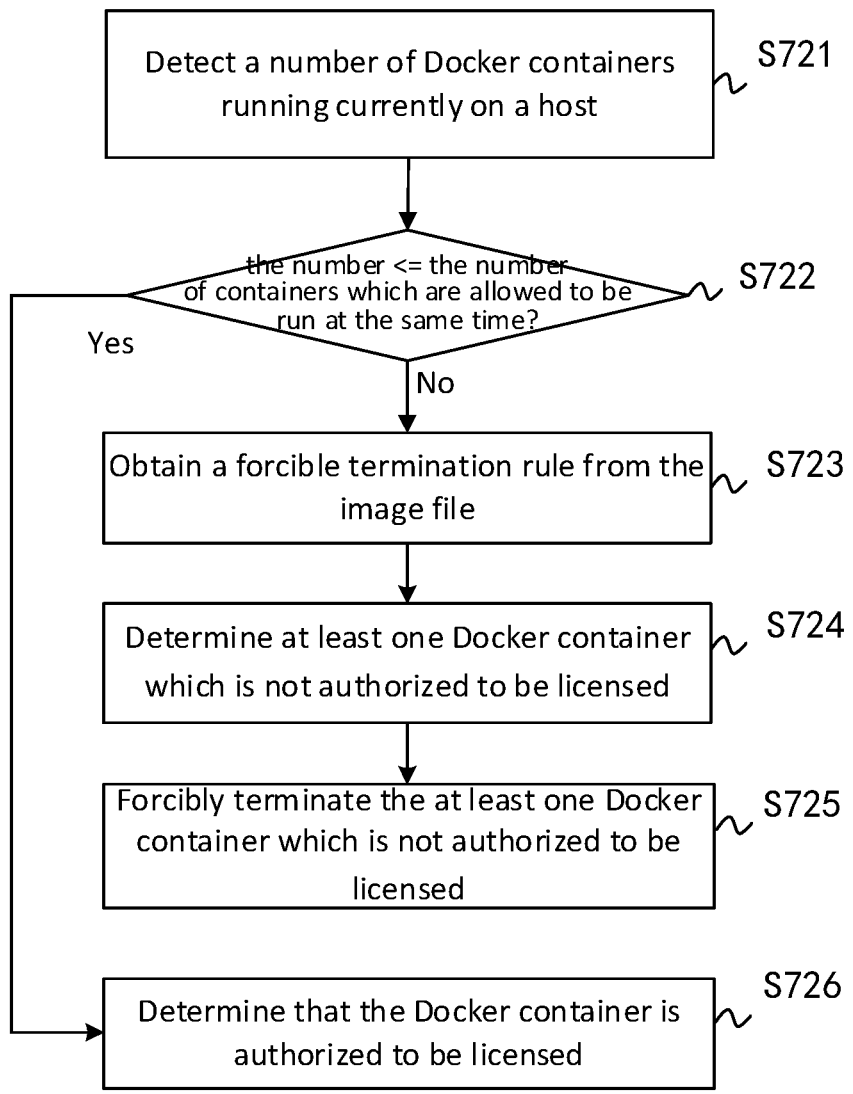
FIG. 7b shows an example adapted for implementing license audit of example embodiments of this application.

In an example, the authorization rule includes a number of containers which are allowed to be run at the same time, and then with reference to FIG. 7b, it is determined whether the Docker container is authorized to be licensed in the following way.

S721, an actual number of said Docker containers running currently on a host is detected.

S722, it is judged whether the actual number is less than or equal to the number of containers which are allowed to be run at the same time.

S723, if the judgment is no, a forcible termination rule is obtained from the image file.

S724, the at least one said Docker container which is not authorized to be licensed is determined from multiple Docker containers that are running according to the forcible termination rule.

S725, the at least one said Docker container which is not authorized to be licensed is forcibly terminated.

S726, if the judgment is yes, it is determined that the Docker container is authorized to be licensed.

Figure 7C:
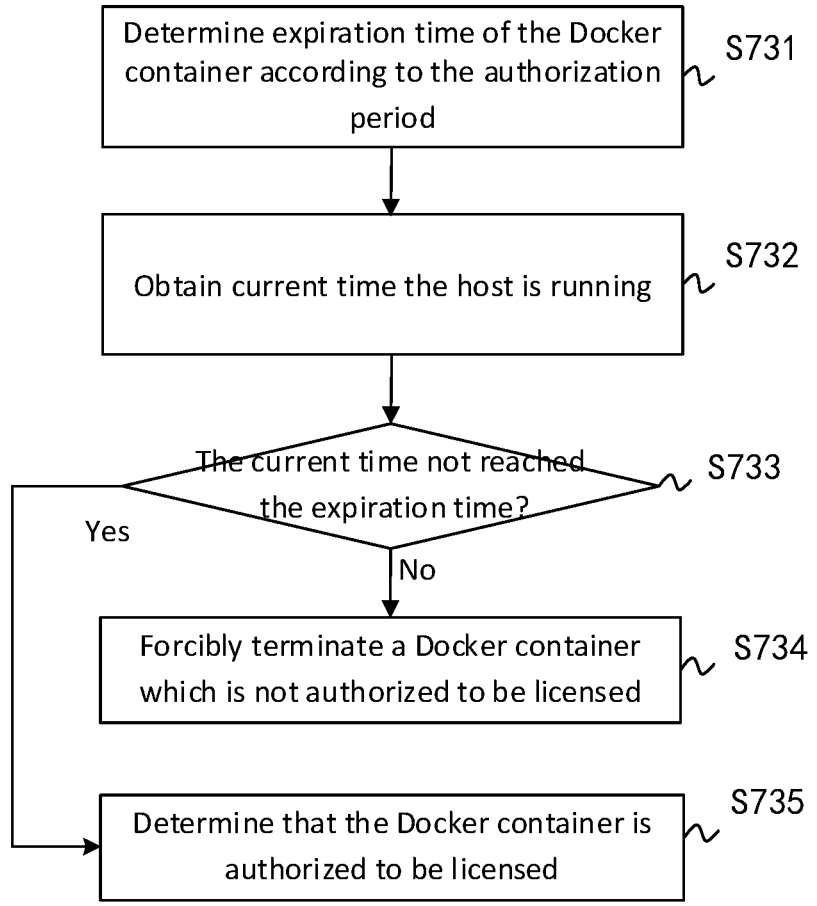
FIG. 7c shows another example adapted for implementing license audit of example embodiments of this application.

In another example, the authorization rule includes an authorization period of the Docker container, and then with reference to FIG. 7c, it is determined whether the Docker container is authorized to be licensed in the following way.

S731, expiration time of the Docker container is determined according to the authorization period.

S732, current time the host is running is obtained.

S733, it is judged whether the current time has not reached the expiration time.

S734, if the judgment is no, a Docker container which is not authorized to be licensed is forcibly terminated.

S735, if the judgment is yes, it is determined that the Docker container is authorized to be licensed.

It should be noted that although the operations of the method of this disclosure have been described in a specific order in the drawings, this does not require or suggest that the operations must be performed in this specific order, or all the illustrated operations must be performed so as to realize a desired result.

By obtaining an image file of a Docker container which is in a startup state and determining whether the Docker container is authorized to be licensed according to a license file in the image file, the Docker container based application authorization licensing method proposed by the embodiments of this application effectively guarantees the controllability of the Docker container in licensed and compliant operation, and solves the problem that a controllable protection cannot be done for a software provider due to replication and abuse of authorization. Meanwhile, by directly building license information into the image file, it greatly reduces the difficulty in privatization deployment and upgrade, and may achieve zero awareness of license by a business application.

Figure 8:
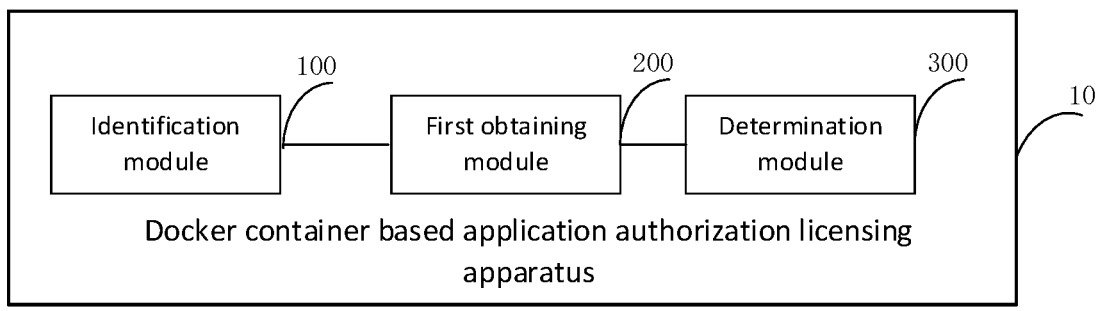
FIG. 8 shows a block diagram adapted for implementing a Docker container based application licensing apparatus of example embodiments of this application.

Further with reference to FIG. 8, it shows an exemplary structural block diagram of a Docker container based application licensing apparatus 10 according to example embodiments of this application.

As shown in FIG. 8, the Docker container based application licensing apparatus 10 includes: an identification module 100, a first obtaining module 200 and a determination module 300.

The identification module 100 is used for identifying a Docker container which is in a startup state;

the first obtaining module 200 is used for obtaining an image file of the Docker container and obtaining a license file of the Docker container from the image file; and the determination module 300 is used for determining whether the Docker container is authorized to be licensed according to the license file.

In an embodiment, in some embodiments, the Docker container is started by a business node based on the image file, and the image file is pulled and obtained by the business node from a Private Cloud.

In an embodiment, in some embodiments, a secure path of the license file is burned into the image file, and the first obtaining module 200 is specifically used for:

reading a digest of the image file, obtaining the image file and determining the authenticity of the image file through the digest, thereby getting the secure path; and reading the license file according to the secure path.

In an embodiment, in some embodiments, the determination module 300 is specifically used for:

decrypting the license file to get at least one license tag for the Docker container; and determining whether the Docker container is authorized to be licensed based on the at least one license tag.

In an embodiment, in some embodiments, the license tag includes a preset number of containers running at the same time, and the determination module 300 is further used for:

detecting an actual number of Docker containers running currently on a host; and determining that the Docker container is authorized to be licensed when the actual number is less than or equal to the preset number of containers.

In an embodiment, in some embodiments, the license tag includes an authorization period of the Docker container, and the determination module 300 is further used for:

determining expiration time of the Docker container according to the authorization period;

obtaining current time the host is running; and determining that the Docker container is authorized to be licensed when the current time has not reached the expiration time.

In an embodiment, in some embodiments, the above-mentioned apparatus 10 further includes:

a second obtaining module for obtaining at least one Docker container which is not authorized to be licensed;

a third obtaining module for obtaining a forcible termination rule from the image file; and a forcible termination module for forcibly terminating the at least one Docker container which is not authorized to be licensed according to the forcible termination rule.

It should be appreciated that the various units or modules recorded in the above apparatus 10 correspond to the various steps in the method described with reference to FIG. 1. Therefore, the operations and features described with respect to the method equally apply to the apparatus 10 and the units contained therein, which will not be repeated here any longer. The apparatus 10 may pre-implemented in a browser or other security applications of an electronic device, or also may be loaded by way of download or the like into the browser or other security applications of the electronic device. Corresponding units in the apparatus 10 may cooperate with units in the electronic device to realize the schemes of the embodiments of this application.

Several modules or units are mentioned in the above detailed description, and such a division is not mandatory. In fact, according to an implementation of this disclosure, features and functions of two or more modules or units described in the above may be embodied in one module or unit. On the contrary, features and functions of one module or unit described in the above may further be divided to be embodied by multiple modules or units.

By obtaining an image file of a Docker container which is in a startup state and determining whether the Docker container is authorized to be licensed according to a license file in the image file, the Docker container based application authorization licensing apparatus proposed by the embodiments of this application effectively guarantees the controllability of the Docker container in licensed and compliant operation, and solves the problem that a controllable protection cannot be done for a software provider due to replication and abuse of authorization.

Figure 9:
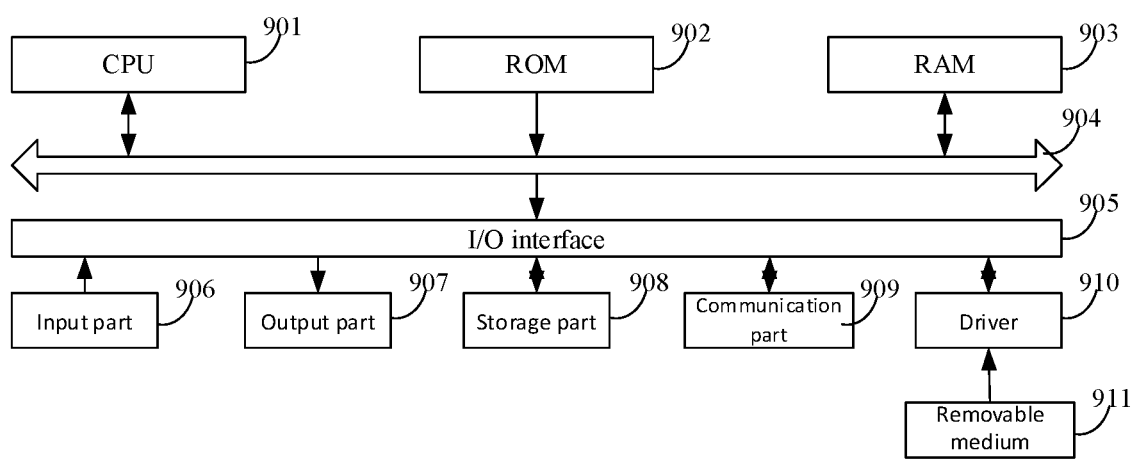
FIG. 9 shows a structure diagram of a computer system adapted for implementing an electronic device or a server of embodiments of this application.

In the following, with reference to FIG. 9, FIG. 9 shows a structure diagram of a computer system adapted for implementing an electronic device or a server of an embodiment of this application.

As shown in FIG. 9, a computer system 900 includes a central processing unit (CPU) 901, which may perform various suitable actions and processing according to a program stored in a read-only memory (ROM) 902 or a program loaded from a storage part 908 to a random access memory (RAM) 903. Various programs and data required for operation instructions of the system are further stored in the RAM 903. The CPU 901, the ROM 902 and the RAM 903 are coupled to each other via a bus 904. An input/output (I/O) interface 905 is also coupled to the bus 904.

The following components are coupled to the I/O interface 905: an input part 906 including a keyboard, a mouse, etc.; an output part 907 including for example a cathode ray tube (CRT), a liquid crystal display (LCD), etc. and a speaker, etc.; a storage part 908 including a hard disk, etc.; and a communication part 909 including a network interface card such as a LAN card, a modem, etc. The communication part 909 performs communication processing via a network such as Internet. A drive 910 is also coupled to the I/O interface 905 as needed. A removable medium 911 such as a magnetic disk, an optical disk, a magneto-optical disk, a semiconductor device or the like is installed on the drive 910 as needed, in order that a computer program read out from it is installed into the storage part 908 as needed.

In particular, according to an embodiment of this application, the processes described above with reference to the flow chart FIG. 1 may be implemented as a computer software program. For example, an embodiment of this application includes a computer program product including a computer program carried on a computer readable medium, which computer program contains program codes for implementing a method as shown in a flow chart. In such an embodiment, the computer program may be downloaded and installed from a network by the communication part 909, and/or installed from the removable medium 911. When executed by the central processing unit (CPU) 901, the computer program implements the above functions defined in the system of this application.

It is noted that the computer readable medium illustrated in this application may be a computer readable signal medium or a computer readable storage medium or any combination of the two. The computer readable storage medium may be for example, but not limited to, an electric, magnetic, optical, electromagnetic, infrared or semiconductor system, apparatus or device, or any combination thereof. More specific examples of the computer readable storage medium may include, but are not limited to, an electrical connection with one or more wire, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this application, the computer readable storage medium may be any tangible medium containing or storing a program, which program may be used by or in combination with an instruction execution system, apparatus or device. In this application, the computer readable signal medium may include a data signal propagated in a baseband or as part of a carrier wave, with a computer readable program code carried thereon. Such a propagated data signal may take a variety of forms, including but not limited to an electromagnetic signal, an optical signal or any suitable combination thereof. The computer readable signal medium may further be any computer readable medium other than the computer readable storage medium, which may send, propagate or transmit a program for being used by or in combination with the instruction execution system, apparatus or device. The program code included in the computer readable medium may be transmitted by any suitable medium, including but not limited to wireless, wire, cable, RF, etc., or any suitable combination thereof.

The flow charts and block diagrams in the drawings illustrate system architectures, functions and operation instructions that may be implemented by the system, method and computer program product of the various embodiments of this application. In this respect, each box in the flow charts or block diagrams may represent a portion of a code, a program segment, or a module, and the portion of the code, the program segment, or the module contains one or more executable instruction for implementing a specified logic function. It should also be noted that in some alternative implementations, functions marked in boxes may also take place in an order other than those marked in the drawings. For example, two successively marked boxes may in fact be implemented basically in parallel, and they sometimes may also be implemented in a reverse order, which depends on the involved function. It should also be noted that each box in the block diagrams and/or flow charts and a combination of boxes in the block diagrams and/or flow charts may be implemented by a dedicated hardware-based system for implementing a specified function or operation instruction, or may be implemented by a combination of dedicated hardware and computer instructions.

An involved unit or module described in an embodiment of this application may be implemented by way of software, or also may be implemented by way of hardware. The described units or modules may also be arranged in a processor, which for example may be described as: a processor including a Docker container based application authorization licensing method as described. Therein, in some case, the names of these units or modules do not constitute a limitation to the units or modules themselves. For example, an identification module may further be described as "identifying a Docker container which is in a startup state".

On the other hand, this application further provides a computer readable storage medium, which may be one contained in an electronic device described in the above embodiments, or also may be one which is stand-alone and is not assembled into the electronic device. The computer readable storage medium stores one or more program, which is used by one or more processor to perform a Docker container based application authorization licensing method described in this application.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component", etc. as used herein generally represent software, firmware, hardware, or a combination thereof. The features of the techniques described herein are platform-independent, meaning that the techniques may be implemented on a variety of computing platforms having a variety of processors.

What is described above is just the preferable embodiments of the application and the illustration of the applied technical principles. It should be appreciated by the person having ordinary skills in the art that the scope of the disclosure involved in this application is not limited to technical solutions formed by specific combinations of the above technical features, and at the same time, should also encompass other technical solutions formed by any combinations of the above technical features or their equivalent features, without departing from the concepts of the disclosure, for example, technical solutions formed by the above features and technical features (not limited thereto) disclosed in the application and having similar functions replacing each other.

The invention claimed is:

1. A Docker container based application licensing method, said method comprising:
   identifying a Docker container which is in a startup state;
   obtaining an image file of the Docker container and obtaining a license file of the Docker container from the image file; and
   determining whether the Docker container is authorized to be licensed according to the license file,
   wherein a secure path of the license file is burned into the image file, and wherein the obtaining an image file of the Docker container and obtaining a license file of the Docker container from the image file further comprises:
   obtaining the image file to get the secure path therefrom; and
   reading the license file according to the secure path.

2. The method as claimed in claim 1, wherein the license file is encrypted, and the determining whether the Docker container is authorized to be licensed according to the license file further comprises:
   decrypting the license file to get at least one license tag for the Docker container, which indicates an authorization rule; and
   determining whether the Docker container is authorized to be licensed based on the at least one license tag.

3. The method as claimed in claim 2, wherein the authorization rule comprises a number of containers which are allowed to be run at the same time, and wherein the determining whether the Docker container is authorized to be licensed based on the at least one license tag comprises:
   detecting an actual number of the Docker containers running currently on a host; and determining that the Docker container is authorized to be licensed when the actual number is less than or equal to the number of containers which are allowed to be run at the same time.

4. The method as claimed in claim 3, wherein the method further comprises:
determining at least one of the Docker containers which is not authorized to be licensed when the actual number is larger than the number of containers which are allowed to be run at the same time; and
forcibly terminating the at least one said Docker container which is not authorized to be licensed.

5. The method as claimed in claim 4, wherein the determining at least one of the Docker containers which is not authorized to be licensed comprises:
obtaining a forcible termination rule from the image file; and
determining the at least one of the Docker containers which is not authorized to be licensed from the Docker containers that are running according to the forcible termination rule.

6. The method as claimed in claim 2, wherein the authorization rule comprises an authorization period of the Docker container, and wherein the determining whether the Docker container is authorized to be licensed based on the at least one license tag comprises:
determining expiration time of the Docker container according to the authorization period;
obtaining a current time a host is running; and
determining that the Docker container is authorized to be licensed when the current time has not reached the expiration time.

7. The method as claimed in claim 1, further comprising:
sending alarm information to a corresponding application and/or recording the alarm information in an application log in response to determination that the Docker container is not licensed.

8. The method as claimed in claim 1, further comprising:
recording an authorization log.

9. An electronic device comprising a memory, a processor and a computer program which is stored on the memory and may be run on the processor, wherein when executing the computer program, the processor implements the following operations:
identifying a Docker container which is in a startup state;
obtaining an image file of the Docker container and obtaining a license file of the Docker container from the image file; and
determining whether the Docker container is authorized to be licensed according to the license file,
wherein a secure path of the license file is burned into the image file, and wherein the obtaining an image file of the Docker container and obtaining a license file of the Docker container from the image file further comprises:
obtaining the image file to get the secure path therefrom; and
reading the license file according to the secure path.

10. The electronic device as claimed in claim 9, wherein the license file is encrypted, and wherein the determining whether the Docker container is authorized to be licensed according to the license file comprises:
decrypting the license file to get at least one license tag for the Docker container, which indicates an authorization rule; and
determining whether the Docker container is authorized to be licensed based on the at least one license tag.

11. The electronic device as claimed in claim 10, wherein the authorization rule comprises a number of containers which are allowed to be run at the same time, and wherein the determining whether the Docker container is authorized to be licensed based on the at least one license tag comprises:
detecting an actual number of the Docker containers running currently on a host; and
determining that the Docker container is authorized to be licensed when the actual number is less than or equal to the number of containers which are allowed to be run at the same time.

12. The electronic device as claimed in claim 11, wherein the processor, when executing the computer program, further implements operations comprising:
determining at least one of the Docker containers which is not authorized to be licensed when the actual number is larger than the number of containers which are allowed to be run at the same time; and
forcibly terminating the at least one said Docker container which is not authorized to be licensed.

13. The electronic device as claimed in claim 12, wherein the determining at least one of the Docker containers which is not authorized to be licensed comprises:
obtaining a forcible termination rule from the image file; and
determining the at least one of the Docker containers which is not authorized to be licensed from the Docker containers that are running according to the forcible termination rule.

14. The electronic device as claimed in claim 10, wherein the authorization rule comprises an authorization period of the Docker container, and wherein the determining whether the Docker container is authorized to be licensed based on the at least one license tag comprises:
determining expiration time of the Docker container according to the authorization period;
obtaining current time a host is running; and
determining that the Docker container is authorized to be licensed when the current time has not reached the expiration time.

15. The electronic device as claimed in claim 10, wherein the obtaining an image file of the Docker container and obtaining a license file of the Docker container from the image file further comprises:
reading a digest of the image file, and determining authenticity of the image file through the digest, wherein the digest is a unique identification of the image file.

16. The electronic device as claimed in claim 9, wherein the processor, when executing the computer program, further implements operations comprising:
sending alarm information to a corresponding application and/or recording the alarm information in an application log in response to determination that the Docker container is not licensed.

17. The electronic device as claimed in claim 9, wherein the processor, when executing the computer program, further implements operations comprising:
recording an authorization log.

18. A computer readable storage medium storing a computer program thereon, wherein when executed by a processor, the computer program implements the following operations:
identifying a Docker container which is in a startup state;
obtaining an image file of the Docker container and obtaining a license file of the Docker container from the image file; and determining whether the Docker container is authorized to be licensed according to the license file,
wherein a secure path of the license file is burned into the image file, and wherein the obtaining an image file of the Docker container and obtaining a license file of the Docker container from the image file further comprises:
obtaining the image file to get the secure path therefrom; and
reading the license file according to the secure path.

* * * * *